April 12, 1966     D. E. ROYAL     3,246,331
DIRECTION FINDER ANTENNA APPARATUS
Filed Aug. 20, 1958     2 Sheets-Sheet 1
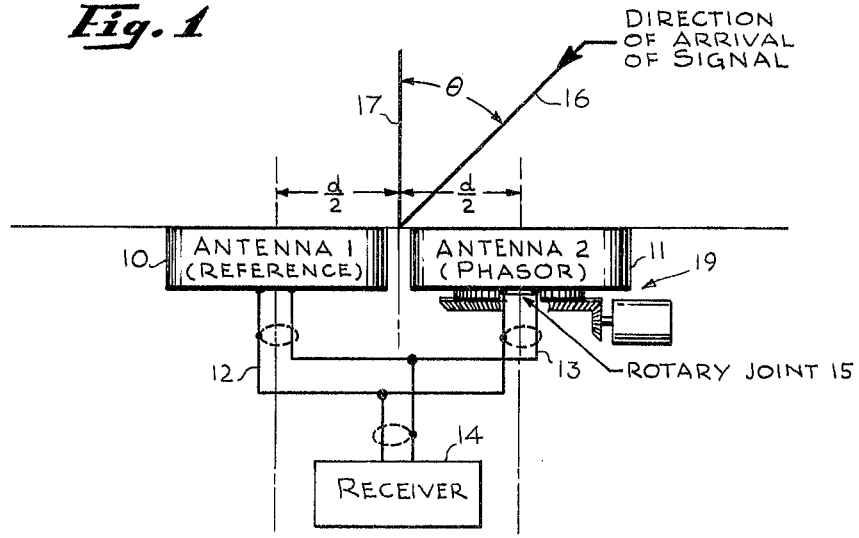
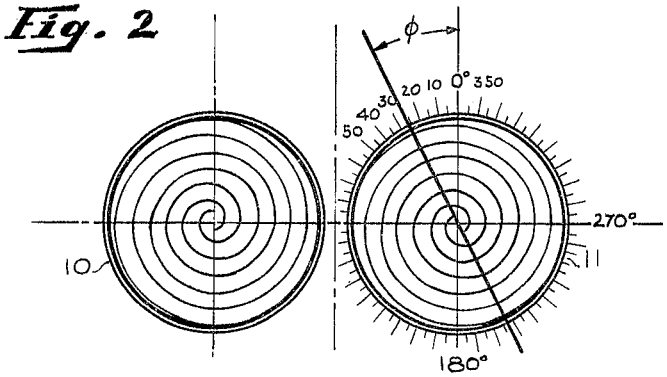
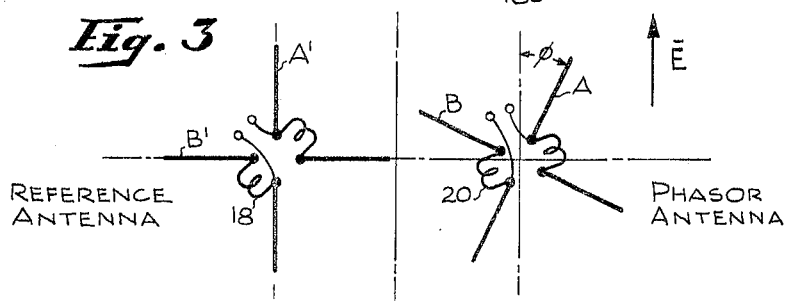
DOUGLAS E. ROYAL
INVENTOR.
BY *Allen E. Botney, Agent*
*Morris Spector*
ATTORNEY 3,246,331
DIRECTION FINDER ANTENNA APPARATUS
Douglas E. Royal, Playa Del Rey, Calif., assignor, by mesne assignments, to Thompson Ramo Wooldridge, Inc., Cleveland, Ohio, a corporation of Ohio
Filed Aug. 20, 1958, Ser. No. 756,118
16 Claims. (Cl. 343—113)

The present invention relates in general to direction finder apparatus and more particularly to a pair of antennas adapted to provide directional information in terms of angular displacement between the antennas.

Existing apparatus for determining the direction from which signals are received is proving to be increasingly inadequate to meet the demands of high-speed automatized reconnaissance systems. One type of present-day apparatus, for example, measures the angle of signal arrival by employing a phase comparison technique wherein the phase difference between the signals induced in a pair of proximately spaced antenna provides the desired directional information. However, phase comparison requires the use of either dual radio-frequency receiver channels with matched phase and gain characteristics, a relatively cumbersome and difficult mechanism to construct and maintain, or else calibrated wide bandwidth radio-frequency phase shifters which are difficult to devise. Furthermore, phase comparison techniques have not proven to be readily adaptable to automatic instrumentation.

It is, therefore, an object of the present invention to provide novel means for determining the geographical location of electronic installations by measurements made on signals radiated by these installations.

It is another object of the present invention to provide means for readily obtaining directional information over a relatively wide range of signal frequencies.

It is a further object of the present invention to provide means for measuring the angle of signal arrival without the use of dual receiver channels or special phase-shifter apparatus.

It is an additional object of the present invention to provide means for determining the direction of a signal source by translating phase difference information between two antennas into angular displacement of one antenna.

The present invention significantly improves upon the art of signal source location in that each and every one of the several above-mentioned limitations and disadvantages are substantially eliminated. According to the basic concept of the present invention, a pair of antennas is provided having phase-shift characteristics which make it possible, by rotating one antenna with respect to the other, to increase the phase difference between the signals received at the two antennas until the two signals are completely out of phase and, therefore, cancel each other. Since the initial phase difference between the signals is related to the angle of signal arrival, the angle through which the one antenna is rotated to produce the output null is also related to the angle of signal arrival, with the result that the antenna angular displacement provides the desired directional information.

More particularly, in its simplest form, the direction finding system of the present invention makes use of a reference antenna and a circularly polarized antenna, the phasor antenna, whose outputs are added together and supplied to a receiver used as a null detector. The phasor antenna is rotated at a constant rate and its instantaneous angular position measured. The rotational angular position at which a signal null occurs then defines the angle of arrival of the signals whose source is to be directionally located.

With the aid of the present invention, source location can now be accomplished with only a single receiver channel, which is used solely as a sensitive amplitude detector. Furthermore, no additional phase-shifter equipment is required since the antennas employed automatically provide the wide-bandwidth calibrated phase-shift function. Furthermore, apparatus embodying the concept of the present invention is especially well suited for automatic instrumentation and, in addition, has particular utility in airborne direction-finding applications where flush-mounted antennas are desirable.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only and are not intended as a definition of the limits of the invention.

FIG. 1 is a block diagram of a direction finding system according to the present invention;

FIG. 2 is a top view of a pair of spiral antennas that may be used in the system of FIG. 1;

FIG. 3 shows two sets of crossed dipole antennas which may be used in the system of FIG. 1 and which is illustrated here to explain the basic principles underlying the invention.

Figure 4:
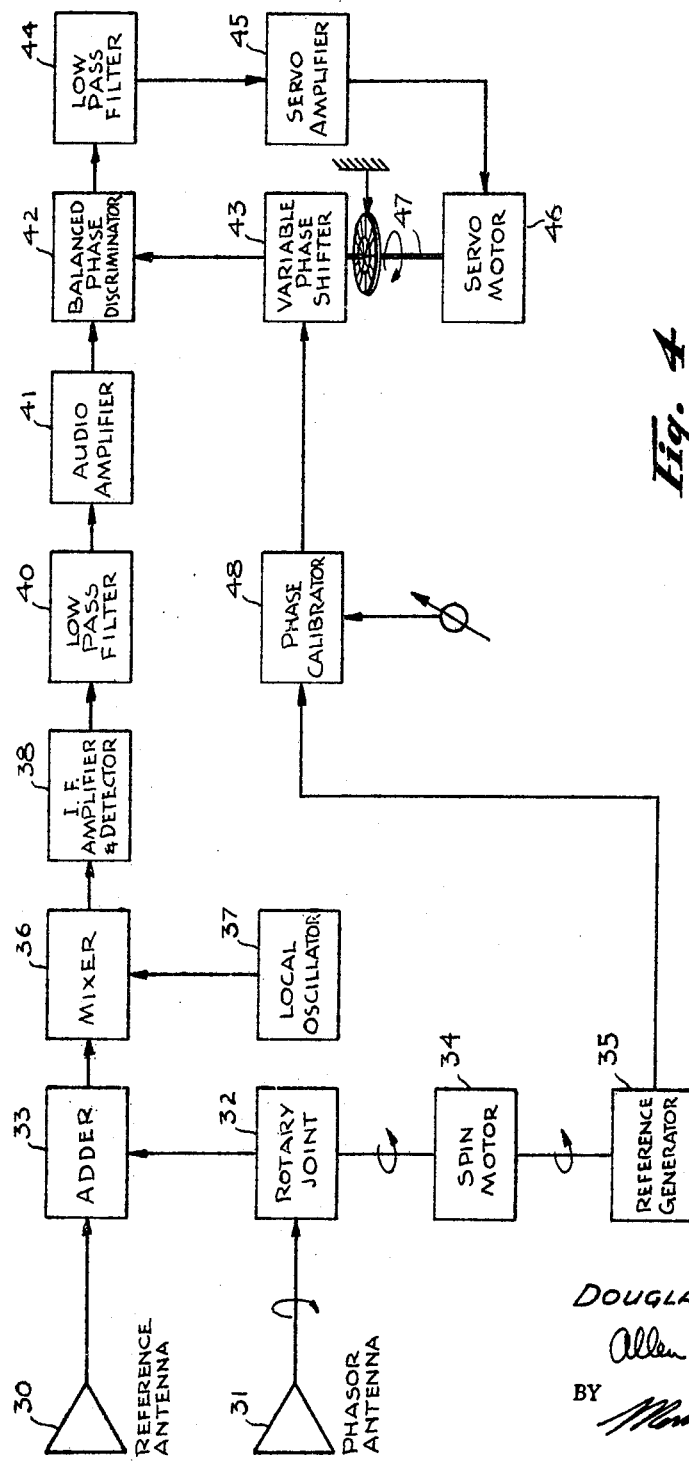
FIG. 4 is a block diagram of a completely automatized direction finding system according to the present invention.

Referring now to the drawings, there is shown in FIG. 1 a pair of antennas designated 10 and 11 which are proximately spaced from each other and preferably but not necessary coplanar, antenna 10 being hereinafter referred to as the "reference" antenna and antenna 11 hereinafter being referred to as the "phasor" antenna. Reference antenna 10 may be circularly polarized but it is only required that it be sensitive to the polarization of the received signal. Furthermore, the reference antenna is preferably non-rotatably mounted, that is to say, the antenna is preferably mounted in a fixed position. Phasor antenna 11, on the other hand, is rotatably mounted and must be either circularly or elliptically polarized. In addition, the phasor antenna must produce a field pattern having substantial rotational symmetry about its axis of rotation. Rotation for phasor antenna 11 may be provided by means of a simple gearing arrangement coupled by means of a shaft to a motor drive. The gearing arrangement, shaft and motor drive are generally designated 19 in FIG. 1.

More specifically, for optimum results, the following conditions must hold:

(a) The phasor antenna must be circularly polarized;
(b) The phasor antenna must have a pattern displaying rotational symmetry about its axis of rotation; and
(c) Both the phasor and reference antennas must exhibit identical sensitivities and pattern factors with respect to the incoming signal, i.e., they must have identical effective areas and identical pattern shapes similarly oriented.

For effective but less than optimum operation, the characteristics of the phasor antenna may depart somewhat from conditions a, b and c delineated above. Thus, by way of example, phasor antenna 11 may be elliptically polarized rather than circularly polarized or may have a pattern that is not quite symmetrical about its axis of rotation, or both.

Although several different types of antennas may be used, antennas 10 and 11 are preferably cavity-backed Archimedean spiral antennas which are illustrated in FIG. 2. Such antennas are commercially available and are desirable for a number of reasons: (1) because such antennas produce a single circularly polarized beam of constant beamwidth possessing rotational symmetry about the axis perpendicular to the antenna aperture, (2)

because they are broadband and hence effective over a wide range of frequencies, (3) because they have desirable phase-shifting characteristics, (4) because they lend themselves nicely to printed circuit techniques, (5) because they readily lend themselves for flush mounting in aircraft and (6) because they can be made quite light in weight.

Antennas 10 and 11 are respectively connected by means of a pair of equal length transmission lines 12 and 13 to a common set of output terminals which is also the input to a receiver 14. It will be obvious that since antenna 11 is to be rotatably mounted, then the antenna must be coupled to transmission line 13 through a rotary joint which is generally designated 15 in FIG. 1. A host of well-known rotary joints is available for such intercoupling purposes.

Considering FIG. 1 still further, antennas 10 and 11 are positioned apart from each other by a distance "$d$" measured from the center of one antenna to the center of the other antenna. The direction from which a signal is arriving at the antennas is indicated by an arrow 16 which forms an angle $\theta$ with a line 17 which is perpendicular to the plane in which the apertures of the antennas lie.

Considering now the operation, the output voltage of antennas 10 and 11 is given by the equation $$V = KEF(\theta)\left[e^{-j\beta\frac{d}{2}\sin\theta} + e^{j(\beta\frac{d}{2}\sin\theta + \phi)}\right]$$

where

K is a constant of proportionality; it is an effective length,

E is the electric field at the center of the array, $F(\theta)$ is the pattern factor of each antenna by itself, $\beta$ is $2\pi/\lambda$, $\lambda$ is wavelength, $\theta$ is the angle of signal arrival, measured as shown in FIG. 1, $\phi$ is the angular displacement of the phasor antenna with respect to the reference antenna, measured as shown in FIG. 2.

It will be obvious to anyone skilled in mathematics that the values of $\phi$ for which nulls will occur at the input of receiver 14 are given by the equation $$\phi = (2N+1)\pi - \beta d \sin\theta \quad (2)$$

where $$N = 0, \pm 1 \pm 2 \ldots$$

Equation 2 may be obtained from Equation 1 simply by setting "V" in Equation 1 equal to zero and then solving for $\phi$. Thus, it is seen that a signal arriving at any angle $\theta$ within the antenna beamwidth given by $F(\theta)$ may be nulled by rotating phasor antenna 11 until the angle $\phi$, which is shown in FIG. 2, is equal to a value specified above by Equation 2 which relates the angle of rotation $\phi$ to the angle of arrival of the signal $\theta$. It will be recognized that unequal lengths of transmission lines 12 and 13 can be calibrated out.

At least two methods of extracting the directional information are available. According to one method, phasor antenna 11 (or its spiral aperture plate only) may be rotated at a constant rate and its instantaneous angular position measured. The rotational angular position at which a signal null occurs then defines the angle of arrival of the signal in accordance with the relation between the two angles established by Equation 2. Another method which is well known in the electronics arts involves the use of a null-seeking servomechanism which would automatically adjust the angular position of antenna 11 whereat the signal applied to receiver 14 is a minimum.

The operation of the direction-finding system of the present invention can perhaps be explained best by referring to FIG. 3 wherein are shown a reference antenna and a rotatable phasor antenna, each consisting of a pair of dipoles oriented at right angles to one another. In the phasor antenna, the dipoles are designated A and B whereas in the reference antenna the two dipoles are designated A' and B'. One of the dipoles of each antenna is connected to the other dipole of the same antenna through a quarter wavelength phasing section, the phasing sections for the reference and phasor antennas being respectively designated 18 and 20.

Both the reference and phasor antennas are mounted side by side coplanarly and they are connected to a common receiver (not shown) through equal-length transmission lines. Thus, the reference and phasor antennas of FIG. 3 are each sensitive to circularly polarized radiation coming from directions generally broadside to their common planar aperture. Assuming that a signal arrives from directly broadside so that it arrives in phase at each antenna, if the phasor antenna is rotated until its output voltage is in phase with that of the reference antenna, a maximum output voltage is produced. Rotation of the phasor antenna by 180° will then cause its output voltage to cancel that of the reference antenna, which is the null condition for signals arriving from broadside. Assume now that a signal arrives from a direction such that the induced voltage in the phasor antenna lags (or leads) that in the reference antenna. Then the phasor antenna may be rotated until its output voltage again cancels that of the reference antenna. The angle $\phi$ through which the phasor antenna is rotated to achieve a null condition corresponds to the angle of signal arrival and, therefore, provides an indication of the direction from which the signal is coming.

An understanding of the manner in which the dipole reference and phasor antennas of FIG. 3 and, therefore, the spiral antennas of FIG. 2, operate may be facilitated by a mathematical treatment. Accordingly, if for simplicity the electric field of the signal arriving at phasor antenna 20 in FIG. 3 is in the direction indicated by the vector $\overline{E}$, then the voltage induced in individual dipole antennas A and B would be as follows:

$$V_A = hE_0 \cos\phi \cos wt \quad (3)$$
$$V_B = hE_0 \sin\phi \cos wt \quad (4)$$

where $E_0 \cos wt$ is the electric field at the center of the phasor antenna; and $h$ is the effective length of either dipole. Now, if a 90° shift is added to the voltage induced in line B due to phasing section 20, then $V_B$ of Equation 4 becomes $$V'_B = hE_0 \sin\phi \cos(wt - \pi/2)$$
$$= hE_0 \sin\phi \sin wt \quad (5)$$

The output voltage of phasor antenna 11 or, stated differently, the input voltage it presents to the receiver is equal to the sum of $V_A$ and $V_B'$ or $$V_S = V_A + V_B' = hE_0 (\cos\phi \cos wt + \sin\phi \sin wt)$$

which, trigonometrically, reduces to $$V_S = hE_0 \cos(wt - \phi)$$

It is thus seen that by rotating the phasor antenna through an angle $\phi$, it is possible to introduce a corresponding phase shift in its output voltage with respect to the phase of the electric field at its center and in this way cause this output voltage to be completely out of phase with the voltage developed by the reference antenna, thereby producing the null or minimum output which provides the angular indication of signal arrival at the antennas.

The Archimedean spiral antenna of FIGS. 1 and 2 operates throughout its useful frequency range as if it formed two pairs of crossed dipoles having a physical spacing of less than $\lambda/\pi$ between members of a pair having a time phase difference of $\lambda/4$ between the crossed pairs. Thus, a spiral antenna operates as the crossed dipole described above but over a much broader frequency band.

It should be mentioned that the cavity-backed Archimedean spiral antennas which may be used in this invention are of considerable utility for airborne applications in the R-F spectrum lying between tens and thousands of megacycles. For the frequency range above 10,000 megacycles, the use of suitably polarized horn antennas is indicated in view of their small size. Also, horns have higher efficiencies than spirals at the higher frequencies.

It should also be mentioned that although the present invention has been described in connection with obtaining a null at the antenna output, directional information regarding a signal source may also be obtained by tuning the phasor antenna to produce a maximum output voltage. In such a case, the output signals of the reference and phasor antennas are in phase with each other and hence additively combine to produce the maximum output voltage mentioned above. However, as between the two possibilities, tuning the phasor antenna to produce a null condition is preferable since the phasor antenna can be more sharply tuned to produce a null than a maximum.

Finally, it was mentioned earlier that the reference and phasor antennas are preferably but not necessarily coplanarly positioned. The basic requirement appears to be that the beams produced by the two antennas overlap, in which case directional information may be obtained for any signal source located in the beam overlap. Obviously, the greatest overlap and hence the most extensive coverage will be obtained when the antennas are coplanar. Consequently, coplanar positioning of the antennas is preferred.

Reference is now made to FIGURE 4 wherein the antenna apparatus of the present invention as shown in FIGURE 1 is combined with additional electronic apparatus and mechanical elements to form a completely automatic system for determining the direction from which signals are received. As shown, the system of FIGURE 4 comprises a reference antenna 30 and a rotatably mounted phasor antenna 31, the rotatability of the phasor antenna being made possible by a rotary joint 32 in which said antenna is mounted. Both the reference and phasor antennas are electrically connected to an adder 33 which linearly adds the electrical outputs of the two antennas. A motor 34 is provided as the drive means for rotating phasor antenna 31 at a constant angular speed, the motor being connected to the phasor antenna through rotary joint 32 as indicated in the figure.

Motor 34 is also connected to a reference generator 35 which produces a sinusoidally varying voltage when it is driven by the motor, the generator being adapted to produce one complete sine wave of voltage during each revolution of phasor antenna 31. It will be recognized by those skilled in the art that this may easily be accomplished in view of the fact that the same drive, namely, motor 34, is used for both the phasor antenna and the reference generator. Furthermore, the reference generator is preferably adjusted so that its sinusoidal output voltage is synchronized with the rotation of the phasor antenna, that is to say, the period of the generated sine wave coincides exactly with the period of rotation of the phasor antenna. Stated differently, generator 34 is preferably adjusted so that the beginning and end of each sinusoidal cycle of voltage generated by reference generator 35 respectively coincides with the passage of phasor antenna 31 through the 0° and 360° markers which indicate the rotational displacement of the phasor antenna relative to reference antenna 30.

Adder 33 is connected at its output end to a standard type of radio receiver channel comprising a mixer circuit 36, a local oscillator circuit 37, an intermediate-frequency amplifier and detector circuit 38, a low pass filter 40 and an audio amplifier 41. Considering the receiver channel more specifically, mixer 36 is connected at its first input terminal to adder 33 and at its second input terminal to local oscillator 37, the output end of the mixer being connected to intermediate frequency amplifier and detector 38. Low pass filter 40 is connected between amplifier and detector 38 and audio amplifier 41.

The system of FIGURE 4 further includes a balanced phase discriminator circuit 42 having first and second input terminals, the first input terminal being connected to audio amplifier 41 and the second input terminal being connected to a variable phase shifter device 43.

The phase shifter constitutes the output end of a servo loop which comprises a low-pass filter 44, a servo amplifier 45 and a servo motor 46 connected in tandem between phase discriminator 42 and phase shifter 43. In particular, filter 44 is connected between discriminator 42 and servo amplifier 45 and servo motor 46 is connected between the servo amplifier and variable phase shifter 43, the connection between the phase shifter and the servo motor being effected by means of a shift 47.

Referring now to both reference generator 35 and variable phase shifter 43, a phase calibrator circuit 48 is connected between the two whose function will be more clearly understood from the description of the operation to be presented below. Suffice it to say, at this time, that phase calibrator 48 is preferably included in the system to provide means for phase shifting the sinusoidal signal produced by reference generator 35 in order to take into account, and thereby to neutralize, the normal phase shifts encountered by signals passing through the circuits of the radio receiver channel. The receiver channel, it will be remembered, comprises mixer 36, local oscillator 37, intermediate-frequency amplifier and detector 38, low-pass filter 40 and audio amplifier 41 and the phase shifts caused therein are due to capacitive and inductive elements in these circuits.

In considering the operation, it will initially be assumed that a signal is being received by reference and phasor antennas 30 and 31, respectively, and that the general case prevails, namely, that the signal is arriving at some angle $\theta$ with respect to the normal to the plane of these antennas, which angle is to be determined by the system. It will further be initially assumed for clarity of explanation that the phasor antenna is not angularly displaced nor rotating with respect to the reference antenna, that is to say, that the pointer which indicates the number of degrees through which the phasor antenna has been rotated relative to the reference antenna is fixed at the 0° marker.

Having established the above conditions, it will readily be recognized by those skilled in the electronic arts that the signal voltages induced in antennas 30 and 31 in response to the received signal are substantially of equal amplitude but out of phase with each other and that the latter result is due both to the angle of arrival $\theta$ of the received signal and to the spacing of the two antennas which, as previously mentioned, is fixed. Consequently, the extent of the phase difference between the two induced signals is dependent solely upon the angle of arrival $\theta$ of the received signal. Thus, if the phase difference between the signals induced in antennas 30 and 31 in response to a received signal is known, then the angle of arrival of the received signal, that is, the direction from which the signal came, can be computed.

Moreover, in accordance with trigonometric rules, it will also be recognized that when the instantaneous values of the two signal voltages induced in antennas 30 and 31 are linearly added in adder 33, the amplitude and relative phase of the adder output signal voltage bears a fixed mathematical relationship with the amplitudes of and the phase difference between the two signal voltages induced in antennas 30 and 31. The term "relative phase" is intended to mean the phase difference between the adder 33 output signal and either one of the signals induced in antennas 30 and 31, preferably the latter.

Since it was established above that for all practical purposes the amplitudes of the signals induced in antennas 30 and 31 are equal, then the amplitude and relative phase of the adder 33 output is, in the present instance, solely a function of the phase angle between the induced signals. Thus, for example, if the induced signals are in phase, then the adder output signal will have twice the amplitude of either induced signal and will also be in phase with them whereas if the two induced signals are 180° out of phase with each other, then the adder output will be reduced to zero. On the other hand, if the two induced signals are 90° out of phase with each other, then the adder output signal will have an amplitude that is 1.41 times the amplitude of either induced signal and will be 45° out of phase with either of them.

It will readily be seen, therefore, that since the phase difference between the signals induced in antennas 30 and 31 is solely a function of the angle $\theta$, and, furthermore, since the amplitude and relative phase of the adder 33 output signal is solely a function of the phase angle between the signals induced in antennas 30 and 31, then it must necessarily follow that the amplitude and relative phase of the adder output signal is also solely a function of the angle of arrival $\theta$ of the received signal. Hence, if the amplitude and relative phase of the adder 33 output signal is known, the angle of arrival $\theta$ of the received signal can be easily determined.

Although several techniques are available for measuring the amplitude and relative phase of the adder 33 output signal, one of the simplest methods is to phase shift the signal induced in phasor antenna 31 until the two signals applied to adder 33 are 180° out of phase with each other, with the result that a null condition is produced at the adder output that can easily be detected. The difference between 180° (the null condition) and the number of degrees of phase shift to which the phasor antenna signal has been subjected is then equal to the difference in phase in degrees between the two signals originally induced in antennas 30 and 31. This difference in phase, it will be remembered, is the information needed to compute the direction of arrival of the received signal. Thus, by subjecting the signal induced in phasor antenna 31 to a known phase shift to produce an output null at adder 33, the angle of arrival $\theta$ of the received signal can thereby be readily determined.

The desired phase shift can be imposed upon the signal induced in phasor antenna 31 by rotating the phasor antenna until a null condition prevails at the output of adder 33, at which time the number of degrees of phase shift may be noted from the calibrations or markers along the periphery of the phasor antenna. It will be obvious that since the introduced phase shift is related to the angle of arrival $\theta$, the antenna periphery may be calibrated in terms of angle $\theta$ so that the angle of signal arrival may be read directly.

A more sophisticated technique for providing the desired information is embodied in the system of FIG. 4 and involves rotating phasor antenna 31 at a constant speed. Consequently, due to the varying phase shift experienced by the signal induced in the phasor antenna, the phase difference between the signals induced in antennas 30 and 31 varies from 0° to 360° during each complete rotative sweep of the phasor antenna. As a result, the amplitude of the adder 33 output signal also periodically varies between a maximum value and zero, the maximum value occurring when the two signals applied to the adder are in phase and being equal to twice the amplitude of either applied signal, as mentioned before. The zero value of amplitude of the adder 33 output occurs when the two signals produced at the outputs of antennas 30 and 31 are 180° out of phase with each other.

By this time it will be obvious to those skilled in the art that with phasor antenna 31 rotating at a constant speed, the signal produced at the output of adder 33 is modulated and that the modulation envelope is sinusoidal and, furthermore, that the period of the sinusoidal envelope is the same as that of the sinusoidal reference signal produced by reference generator 35. It should also be obvious from all that has been said before that the phase difference between the sinusoidal modulation envelope and the sinusoidal reference signal is related to the phase difference between the signals induced in antennas 30 and 31 and, therefore, is related to the angle of arrival $\theta$ of the received signal. Thus, if the phase angle between the said envelope and reference signals can be determined, the angle $\theta$ can also be made known, which is the object of the present invention.

Accordingly, considering the operation of the apparatus of FIG. 4 still further, the modulated adder 33 output signal is applied to mixer 36 wherein it is heterodyned against the signal generated by local oscillator 37 to produce an intermediate-frequency signal which is likewise sinusoidally modulated. This intermediate-frequency signal is then amplified and detected in amplifier and detector 38 and thereafter passed to low pass filter 40 which, in accordance with well known filter theory, substantially passes only the low frequency modulation signal which will hereinafter be referred to as an audio signal. As shown, the audio signal is amplified by audio amplifier 41 and then applied to balanced phase discriminator 42.

In view of the fact that the signal out of adder 33 cumulatively experiences several phase shifts in passing through circuits 36, 38, 40 and 41 due to the reactive components in those circuits, it is essential in order to avoid error in the final results that the reference signal out of reference generator 35 be phase shifted a corresponding amount. For this purpose, the reference signal is applied to phase calibrator 48 wherein, by manual adjustment, the reference signal is phase shifted the appropriate amount. One expeditious way to determine the phase shift caused by circuits 36, 38, 40 and 41 is to first compare the reference signal out of generator 35 with the modulation envelope of the signal out of adder 33 with the aid of an oscilloscope and then similarly compare the reference signal with the audio signal out of audio amplifier 41.

Having made the corrective adjustment, the reference signal is next applied to variable phase shifter 43 wherein the reference signal may or may not experience another phase shift, as will be explained below. Ignoring for the moment the possibility of this latter phase shift, the reference signal is passed by phase shifter 43 to phase discriminator 42 which produces a control signal whose magnitude and polarity depend upon the phase difference between the audio and reference signals applied to the discriminator. Thus, the discriminator output is zero when the audio and reference signals are in phase with each other, whereas when they are out of phase with each other, the discriminator produces either a positive or negative voltage depending upon whether the audio signal leads or lags the reference signal. The control signal is smoothed by low pass filter 44 through which the signal passes and is then amplified by servo amplifier 45. Thereafter, the amplified control signal is applied to servo motor 46 which, in response to the control signal, will turn shaft 47 in a clockwise or counterclockwise direction depending upon the polarity of the control signal applied thereto.

The rotation of shaft 47 causes an internal adjustment in variable phase shifter 43 which may be an electrical resolver type of synchro and, as a result of this adjustment, the reference signal applied to the phase shifter is shifted in phase in such a manner relative to the audio signal that the phase difference between the two signals is reduced. Consequently, the control voltage developed by phase discriminator 42 is correspondingly reduced. This process of shaft 47 rotation, reference signal phase shift and control signal reduction continues until the control signal is reduced to zero, at which time shaft 47 ceases its rotation. At this point, the audio and reference signals are in phase with each other and the extent of the phase shift to which the reference signal has been subjected may be read directly from the calibrated dial which may be connected to the shaft.

It should be obvious that the phase shift reading on shaft 47 is equal to the original difference in phase between the audio and reference signals applied to discriminator 42 and, therefore, is equal to the phase difference between the reference signal generated by reference generator 35 and the envelope of the modulated signal produced at the output of adder 33. Accordingly, from what has been mentioned previously, it will be recognized that the number of degrees through which shaft 47 has been rotated to produce a null at the output of discriminator 42 is related to the angle of arrival $\theta$ of the received signal or, stated differently, the angle $\theta$ has automatically been translated into a shaft rotation by means of the system of FIG. 4. By suitable calibration of the dial mounted on shaft 47, the angle of arrival $\theta$ may be read directly, thereby providing the desired directional information.

Having thus described the invention, what is claimed as new is:

1. A direction finding system comprising: first and second antennas oriented to simultaneously receive a signal radiated by a signal source in a predetermined region of space, said first antenna being sensitive to a predetermined polarization of the received signal relative to said first antenna to produce a first signal in response thereto and said second antenna being adapted to produce a second signal in response to the received signal irrespective of the direction of polarization thereof relative to said second antenna, said second antenna being rotated at a constant speed and including means for shifting the phase of said second signal relative to said first signal in accordance with the rotational displacement of said second antenna relative to said first antenna, the field pattern of said second antenna being substantially symmetrical about its axis of rotation to produce said second signal at a substantially constant voltage amplitude irrespective of the rotational displacement of said second antenna; means for adding the instantaneous values of said first and second signals to produce a modulated resultant signal having a periodically varying envelope; receiver channel means for demodulating said resultant signal to produce a detected signal; signal source means for generating a periodic reference signal that is synchronized with the rotation of said second antenna; a phase discriminator operable in response to said detected and reference signals to produce a varying output voltage whose magnitude and polarity corresponds to the phase difference between said detected and reference signals; and variable phase shifter apparatus operable in response to said output voltage to phase shift said reference signal in such a manner as to reduce the phase difference between said detected and reference signals to zero, thereby to reduce the output voltage to zero, said phase shift apparatus including means for relating the extent of the phase shift experienced by said reference signal to the angle of arrival of the received signal to provide a direct reading of the desired directional information.

2. The direction finding system defined in claim 1 wherein said circuit further includes a phase calibrator mechanism interposed between said signal source means and said phase shifter apparatus for selectively advancing and retarding the phase of said reference signal to neutralize phase shifts experienced by said resultant signal in passing through said receiver channel means.

3. A direction finding system comprising: first and second antennas oriented to simultaneously receive a signal radiated by a signal source in a predetermined region of space and responsive to the received signal irrespective of the direction of polarization thereof to respectively produce first and second output signals, at least said second antenna being rotatably mounted and including means for shifting the phase of said second output signal relative to said first output signal in accordance with the angular displacement of said second antenna relative to said first antenna, said first and second antennas having field patterns that are substantially symmetrical about their respective axes of rotation to at all times produce output signals of substantially constant voltage amplitude; drive means for rotating said second antenna at a predetermined speed; a signal generator coupled to said drive means and operable in response to the driving force thereof to generate a periodic reference signal that is synchronized with the rotation of said second antenna; means for adding the instantaneous values of said first and second signals to produce a modulated resultant signal having a periodically varying envelope, the envelope period being equal to the rotative period of said second antenna; receiver channel means for demodulating said resultant signal to produce a detected signal; a phase discriminator operable in response to said detected and reference signals to produce a varying output voltage whose magnitude and polarity corresponds to the phase difference between said detected and reference signals; and servomechanism apparatus operable in response to said output voltage for phase shifting said reference signal in such a manner as to reduce the phase difference between said detected and reference signals to zero, thereby to reduce the output voltage to zero, said servomechanism apparatus including means for relating the extent of the phase shift experienced by said reference signal to the angle of arrival of the received signal to provide a direct reading of the desired directional information.

4. The direction finding system defined in claim 3 wherein said circuit further includes a phase calibrator mechanism interposed between said signal generator and said phase shifter apparatus for selectively advancing and retarding the phase of said reference signal to neutralize phase shifts experienced by said resultant signal in passing through said receiver channel means.

5. A direction finding system comprising: first and second antennas oriented to simultaneously receive a signal radiated by a signal source in a predetermined region of space, said first antenna being sensitive to a predetermined polarization of the received signal relative to said first antenna to produce a first signal in response thereto and said second antenna being adapted to produce a second signal in response to the received signal irrespective of the direction of polarization thereof relative to said second antenna, said second antenna being rotated at a constant speed and including means for shifting the phase of said second signal relative to said first signal in accordance with the rotational displacement of said second antenna relative to said first antenna, the field pattern of said second antenna being substantially symmetrical about its axis of rotation to produce said second signal at a substantially constant voltage amplitude irrespective of the rotational displacement of said second antenna; means for adding the instantaneous values of said first and second signals to produce a modulated resultant signal having a periodically varying envelope; an oscillator for generating a heterodyning signal; a mixer circuit for heterodyning said resultant and heterodyning signals to produce an intermediate-frequency signal modulated in substantially the same manner as said resultant signal; detector means for demodulating said intermediate-frequency signal to produce a detected signal varying in substantially the same manner as the envelope of said intermediate-frequency signal; signal source means for generating a periodic reference signal that is synchronized with the rotation of said second antenna; a phase discriminator operable in response to said detected and reference signals to produce a varying output voltage whose magnitude and polarity corresponds to the phase difference between said detected and reference signals; and variable phase shifter apparatus operable in response to said output voltage to phase shift said reference signal in such a manner as to reduce the phase difference between said detected and reference signals to zero, thereby to reduce the output voltage to zero, said phase shift apparatus including means for relating the extent of the phase shift experienced by said reference signal to the angle of arrival of the received signal to provide a direct reading of the desired directional information.

6. The direction finding system defined in claim 5 wherein said circuit further includes a phase calibrator mechanism interposed between said signal source means and said phase shifter apparatus for selectively advancing and retarding the phase of said reference signal to neutralize phase shifts experienced by said resultant signal in passing through said mixer circuit and detector means.

7. A direction finding system comprising: first and second antennas oriented to simultaneously receive a signal radiated by a signal source in a predetermined region of space and responsive to the received signal irrespective of the direction of polarization thereof to respectively produce first and second output signals, at least said second antenna being rotatably mounted and including means for shifting the phase of said second output signal relative to said first output signal in accordance with the angular displacement of said second antenna relative to said first antenna, said first and second antennas having field patterns that are substantially symmetrical about their respective axes of rotation to at all times produce output signals of substantially constant voltage amplitude; drive means for rotating said second antenna at a predetermined speed; a signal generator coupled to said drive means and operable in response to the driving force thereof to generate a periodic reference signal that is synchronized with the rotation of said second antenna; means for adding the instantaneous values of said first and second signals to produce a modulated resultant signal having a periodically varying envelope, the envelope period being equal to the rotative period of said second antenna; an oscillator for generating a heterodyning signal; a mixer circuit for heterodyning said resultant and heterodyning signals to produce an intermediate-frequency signal modulated in substantially the same manner as said resultant signal; detector means for demodulating said intermediate-frequency signal to produce a detected signal varying in substantially the same manner as the envelope of said intermediate-frequency signal; a phase discriminator operable in response to said detected and reference signals to produce a varying output voltage whose magnitude and polarity corresponds to the phase difference between said detected and reference signals; and servomechanism apparatus operable in response to said output voltage for phase shifting said reference signal in such a manner as to reduce the phase difference between said detected and reference signals to zero, thereby to reduce the output voltage to zero, said servomechanism apparatus including means for relating the extent of the phase shift experienced by said reference signal to the angle of arrival of the received signal to provide a direct reading of the desired directional information.

8. The direction finding system defined in claim 7 wherein said circuit further includes a phase calibrator mechanism interposed between said signal generator and said phase shifter apparatus for selectively advancing and retarding the phase of said reference signal to neutralize phase shifts experienced by said resultant signal in passing through said mixer circuit and detector means.

9. A direction finding system comprising: first and second antennas oriented to simultaneously receive a signal radiated by a signal source in a predetermined region of space, said first antenna being sensitive to a predetermined polarization of the received signal relative to said first antenna to produce a first signal in response thereto and said second antenna being adapted to produce a second signal in response to the received signal irrespective of the direction of polarization thereof relative to said second antenna, said second antenna being rotated at a constant speed and including means for shifting the phase of said second signal relative to said first signal in accordance with the rotational displacement of said second antenna relative to said first antenna, the field pattern of said second antenna being substantially symmetrical about its axis of rotation to produce said second signal at a substantially constant voltage amplitude irrespective of the rotational displacement of said second antenna; means for adding the instantaneous values of said first and second signals to produce a modulated resultant signal having a periodically varying envelope; receiver channel means for demodulating said resultant signal to produce a detected signal; signal source means for generating a periodic reference signal that is synchronized with the rotation of said second antenna; a phase discriminator operable in response to said detected and reference signals to produce a varying output voltage whose magnitude and polarity corresponds to the phase difference between said detected and reference signals; a servo-amplifier for amplifying said output voltage to produce a control signal of sufficient power to drive a servomotor therewith; a servomotor rotatable in response to said control signal, the direction and extent of rotation corresponding to the polarity and magnitude, respectively, of said control signal; a variable phase shifter device for phase shifting said reference signal is such a manner according to the direction and extent of rotation of said servomotor as to reduce the phase difference between said reference and detected signals to zero, thereby to reduce said output voltage to zero, said phase shifter device including means for relating the extent of the phase shift experienced by said reference signal to the angle of arrival of the received signal to provide a direct reading of the desired directional information.

10. The direction finding system defined in claim 9 wherein said circuit further includes a phase calibrator mechanism interposed between said signal source means and said variable phase shifter device for selectively advancing and retarding the phase of said reference signal to neutralize phase shifts experienced by said resultant signal in passing through said receiver channel means.

11. A direction finding system comprising: first and second antennas oriented to simultaneously receive a signal radiated by a signal source in a predetermined region of space and responsive to the received signal irrespective of the direction of polarization thereof to respectively produce first and second output signals, at least said second antenna being rotatably mounted and including means for shifting the phase of said second output signal relative to said first output signal in accordance with the angular displacement of said second antenna relative to said first antenna, said first and second antennas having field patterns that are substantially symmetrical about their respective axes of rotation to at all times produce output signals of substantially constant voltage amplitude; drive means for rotating said second antenna at a predetermined speed; a signal generator coupled to said drive means and operable in response to the driving force thereof to generate a periodic reference signal that is synchronized with the rotation of said second antenna; means for adding the instantaneous values of said first and second signals to produce a modulated resultant signal having a periodically varying envelope, the envelope period being equal to the rotative period of said second antenna; receiver channel means for demodulating said resultant signal to produce a detected signal; a phase discriminator operable in response to said detected and reference signals to produce a varying output voltage whose magnitude and polarity corresponds to the phase difference between said detected and reference signals; a servoamplifier for amplifying said output voltage to produce a control signal of sufficient power to drive a servomotor therewith; a servomotor rotatable in response to said control signal, the direction and extent of rotation corresponding to the polarity and magnitude, respectively, of said control signal; a variable phase shifter device for phase shifting said reference signal in such a manner according to the direction and extent of rotation of said servomotor as to reduce the phase difference between said reference and detected signals to zero, thereby to reduce said output voltage to zero, said phase shifter device including means for relating the extent of the phase shift experienced by said reference signal to the angle of arrival of the received signal to provide a direct reading of the desired directional information.

12. The direction finding system defined in claim 11 wherein said circuit further includes a phase calibrator mechanism interposed between said signal generator and said variable phase shifter device for selectively advancing and retarding the phase of said reference signal to neutralize phase shifts experienced by said resultant signal in passing through said receiver channel means.

13. A direction finding system comprising: first and second antennas oriented to simultaneously receive a signal radiated by a signal source in a predetermined region of space, said first antenna being sensitive to a predetermined polarization of the received signal relative to said first antenna to produce a first signal in response thereto and said second antenna being adapted to produce a second signal in response to the received signal irrespective of the direction of polarization thereof relative to said second antenna, said second antenna being rotated at a constant speed and including means for shifting the phase of said second signal relative to said first signal in accordance with the rotational displacement of said second antenna relative to said first antenna, the field pattern of said second antenna being substantially symmetrical about its axis of rotation to produce said second signal at a substantially constant voltage amplitude irrespective of the rotational displacement of said second antenna; means for adding the instantaneous values of said first and second signals to produce a modulated resultant signal having a periodically varying envelope; an oscillator for generating a heterodyning signal; a mixer circuit for heterodyning said resultant and heterodyning signals to produce an intermediate-frequency signal modulated in substantially the same manner as said resultant signal; detector means for demodulating said intermediate-frequency signal to produce a detected signal varying in substantially the same manner as the envelope of said intermediate-frequency signal; signal source means for generating a periodic reference signal that is synchronized with the rotation of said second antenna; a phase discriminator operable in response to said detected and reference signals to produce a varying output voltage whose magnitude and polarity corresponds to the phase difference between said detected and reference signals; a servo-amplifier for amplifying said output voltage to produce a control signal of sufficient power to drive a servomotor therewith; a servomotor rotatable in response to said control signal, the direction and extent of rotation corresponding to the polarity and magnitude, respectively, of said control signal; a variable phase shifter device for phase shifting said reference signal in such a manner according to the direction and extent of rotation of said servomotor as to reduce the phase difference between said reference and detected signals to zero, thereby to reduce said output voltage to zero, said phase shifter device including means for relating the extent of the phase shift experienced by said reference signal to the angle of arrival of the received signal to provide a direct reading of the desired directional information.

14. The direction finding system defined in claim 13 wherein said circuit further includes a phase calibrator mechanism interposed between said signal source means and said variable phase shifter device for selectively advancing and retarding the phase of said reference signal to neutralize phase shifts experienced by said resultant signal in passing through said mixer circuit and detector means.

15. A direction finding system comprising: first and second antennas oriented to simultaneously receive a signal radiated by a signal source in a predetermined region of space and responsive to the received signal irrespective of the direction of polarization thereof to respectively produce first and second output signals, at least said second antenna being rotatably mounted and including means for shifting the phase of said second output signal relative to said first output signal in accordance with the angular displacement of said second antenna relative to said first antenna, said first and second antennas having field patterns that are substantially symmetrical about their respective axes of rotation to at all times produce output signals of substantially constant voltage amplitude; drive means for rotating said second antenna at a predetermined speed; a signal generator coupled to said drive means and operable in response to the driving force thereof to generate a periodic reference signal that is synchronized with the rotation of said second antenna; means for adding the instantaneous values of said first and second signals to produce a modulated resultant signal having a periodically varying envelope, the envelope period being equal to the rotative period of said second antenna; an oscillator for generating a heterodyning signal; a mixer circuit for heterodyning said resultant and heterodyning signals to produce an intermediate-frequency signal modulated in substantially the same manner as said resultant signal; detector means for demodulating said intermediate-frequency signal to produce a detected signal varying in substantially the same manner as the envelope of said intermediate-frequency signal; a phase discriminator operable in response to said detected and reference signals to produce a varying output voltage whose magnitude and polarity corresponds to the phase difference between said detected and reference signals; a servo-amplifier for amplifying said output voltage to produce a control signal of sufficient power to drive a servomotor therewith; a servomotor rotatable in response to said control signal, the direction and extent of rotation corresponding to the polarity and magnitude, respectively, of said control signal; a variable phase shifter device for phase shifting said reference signal in such a manner according to the direction and extent of rotation of said servomotor as to reduce the phase difference between said reference and detected signals to zero, thereby to reduce said output voltage to zero, said phase shifter device including means for relating the extent of the phase shift experienced by said reference signal to the angle of arrival of the received signal to provide a direct reading of the desired directional information.

16. The direction finding system defined in claim 15 wherein said circuit further includes a phase calibrator mechanism interposed between said signal generator and said variable phase shifter device for selectively advancing and retarding the phase of said reference signal to neutralize phase shifts experienced by said resultant signal in passing through said mixer circuit and detector means.

References Cited by the Examiner
UNITED STATES PATENTS

| 2,474,268 | 6/1949 | Marchand. | |
|---|---|---|---|
| 2,663,869 | 12/1953 | Adcock et al. | 343—895 X |
| 2,863,145 | 12/1958 | Turner | 343—895 X |

CHESTER L. JUSTUS, *Primary Examiner.*

R. E. BERGER, *Assistant Examiner.*